Patented May 22, 1951

2,553,577

UNITED STATES PATENT OFFICE 2,553,577

METHOD OF IMPROVING SEED GERMINATION AND COATED SEEDS PRODUCED THEREBY

William J. Hale and Phelps Vogelsang, Midland, Mich.

No Drawing. Application November 14, 1946, Serial No. 709,796

17 Claims. (Cl. 71—2.5)

This invention relates to improvements in seed germination and more particularly to chemical means of inducing the fixation of atmospheric nitrogen by young plants.

In another application, Serial No. 583,844, filed March 20, 1945, the introduction of a soluble form of chlorophyll within the confines of pelleted seeds was likewise found to be conducive to early emergence of young plant; and yet more important, a mixture of this chlorophyll with dried brewers' yeast within pellet coating of seed contributed markedly to speedy germination of seed and to vigorous early growth of plant.

For some time it has been known that dried blood contributed greatly to the worth of a compost with which it was mixed. Indeed the work of Dr. M. C. Rayner, at Bedford College, London, England, in association with Sir Albert Howard, definitely established that the best composts for development of propitious fungi, such as the mycorrhiza, should contain not only dried blood but brewery hop waste (see "An Agricultural Testament" by Sir Albert Howard, Oxford University Press, 1940; and "Pay Dirt" by J. I. Rodale, Devin-Adair Co., New York, 1946). Howard finds: "The mycorrhizal association to be the living bridge by which a fertile soil (rich in humus) and the crop are directly connected and by which food materials ready for immediate use can be transferred from soil to plant. How this association influences the work of the green leaf is one of the most interesting problems science has now to investigate."

The roots of many plants are infested with microscopic fungi; the best known of these fungi, which so admirably serve the needs of plant growth and are indispensable to its well-being, is the mycorrhiza. Of this fungus there are two distinct groups: one that encases the roots, and the second that invades the root cells. Both roots and fungi live off of the humus in the soil and together bestow especial benefits upon each other, a true example of symbiosis. Although this symbiotic relationship between roots and fungi was pointed out in 1877 by the German biologist Wilhelm Pfeffer, it is only of late that we have come to realize that in the growing process the fungous threads of the mycorrhiza are digested by the plant through its roots. This digested material, rich in proteins and carbohydrates, enters the sap-stream and aids in maturing the plant.

The noted research of Dr. Alexander Fleming in detecting the antibiotic action of penicillin, end-product of *Penicillium notatum*, has opened an extensive study in the formation and function of a number of complex molecular structures exhibiting antibiotic properties; most pronouncedly active here are the products developed by bacteria, fungi and molds. The structural formula of penicillin itself is fairly complex, involving as it does a thiazole ring fused with a beta lactam ring.

Generally speaking, molds, fungi and other micro-organisms possess a remarkable avidity for tearing down the most complicated of organic chemical compounds to yield matter freely assimilable to plant roots; yet at the same time producing distinctive chemical entities that enter the sap stream as such and therein play a role of vital importance to the world of flora. We have every reason here to ascribe the formation of plant enzymes to this exact source. The full purport of enzymes of dehydration, oxidation, reduction and condensation, all within the same habitat, and at work on the reduction products of carbonic acid from the atmosphere, by the catalyst chlorophyll under activation by sunlight, is yet to be fully understood.

It is apparent whatever favors the formation within a growing plant of specifically active enzymes, containing carbon, hydrogen, and oxygen together with nitrogen, sulphur and several other elements, will tend to accentuate the general course of plant development. As already noted, the effect of certain vitamins, especially of the B Complex, is productive of good results. Another type of compound, usually of the indole type, is decidedly effective in inducing root growth; such compounds are called auxins or hormones as they are naturally producible by the plant itself. When applied from without these hormones are likely to induce such rapid growth of root systems that the latter burst and die; an example here is that of 2,4-dichlorophenoxyacetic acid (2,4-D). It becomes our purpose, therefore, to institute those conditions that enable the plant itself to produce within its sphere of growth those exact enzymes and hormones that best function to this growth.

It is common knowledge that the presence of iron in the germinating seed, or in close juxtaposition thereto, serves as a catalyst for the production of chlorophyll, without which we cannot have leaf growth. Thus, when dried blood, as heretofore described, is added to a compost we are inclined to look upon such addition as simply one of soluble iron. Recent work, however, indicates that dried blood carries much more of concern than just soluble iron. In dried blood are regularly present both erythrocytes and leucocytes with protein accompaniments; likewise a number of amino acids, notably methyl guanadyl acetic acid (creatine) and its anhydride (creatinine), and glutamic acid and its amide glutamine and aspartic acdi and its amide asparagine; small amounts of cholesterol (protector of red blood corpuscles against hydrolysis), and phospholipoids; together with a host of proteolytic and diastatic enzymes.

A recent report by Virtanen and Laine of the Biochemical Institute of Helsinki, Finland (Nature for January 5, 1946, p. 25) definitely proves that the fixation of atmospheric nitrogen by plants is due primarily to the continuing change from the brown pigment, methemoglobin, back into the red pigment hemoglobin, both of which are present in leguminous root nodules; oxygen, in turn, carries the red pigment over to the brown, hence aeration of soils becomes a necessary concomitant. Too much oxygen may succeed in breaking the porphyrin structure of red hemoglobin, centering upon ferrous iron, and of brown methemoglobin, centering upon ferric iron, yielding a green pigment no longer serviceable as such in this equilibrium.

Accompanying the hemoglobin in root nodules these investigators identified keto succinic (oxalacetic) acid in form of neutral salt. The presence of oxalacetic acid in seedlings arises through the breakdown of carbohydrates. Along with this acid are to be found aspartic acid and glutamic acid in most plants, and all of these are amino acceptors. When they immersed brown root nodules into a very dilute keto succinic acid salt solution the nodules turned red within an hour or two; under sunlight the change was rapid. In that the presence of keto succinic acid in plant sap is always at a peak on bright sunny days, these investigators next proved that on bright days also is the peak of nitrogen fixation; verified also by the greatest change from brown to red pigment.

To the plant biologist it is known that at the end of flowering there is no further production of keto succinic acid in sap stream and hence no further fixation of nitrogen by plant roots. To the biochemist it is known that nitrogen fixation is the accompaniment of the change of brown methemoglobin into red hemoglobin wherein there is simultaneously produced hydroxylamine, or other soluble nitrogen compound, direct from atmospheric nitrogen but only in the presence of keto compounds.

It is now known that these keto compounds present in the sap stream are of such activity as to be able to unite chemically with soluble nitrogen compounds during the process of growth and to lead directly to formation of the pyrrole ring of four carbons and one nitrogen. The grouping of four of these rings (with certain substituent groups) about a ferrous or divalent iron atom constitutes the well-known hematin which when united with a protein is known as hemoglobin. In the plant world, however, the counterpart of hematin is phyllin so well represented by chlorophyll (of certain other substituent groups) but with an atom of magnesium occupying the central position. Hence, though hemoglobin may serve through its property of oxidation to ferric state and then reduction to ferrous state to attach hydrogen directly to nitrogen (fixation), the subsequent function of building up carbon-nitrogen complexes must be transposed to a chlorophyll basis, as the magnesium is the element par excellence that is necessary for capturing carbonic acid from the air and reduction of same through enzymes to all of the substances that make up our flora.

In brief, the molecule of hemoglobin is here seen to serve as a catalyst for the production of chlorophyll, all of which is well substantiated in practice. But in addition to the formation of chlorophyll the growing plant calls for a continuous supply of other reactants capable of effecting the transformations of simple sugars to the whole of plant substance as brought into being by nature. These reactants comprise enzymes and hormones working in sap stream or within cell compartments through osmosis.

Following the discovery of Virtanen and Laine that keto succinic acid in root nodules was capable of speeding up the reduction of brown pigment methemoglobin to the red hemoglobin with accompaniment of nitrogen fixation, we have elected to supply to the seed in pelleted form an excess of dried blood together with keto succinic acid and a group of other oxo and thio compounds such that a twofold effect shall be attained; The first, to be that of supplying the sprouting seeds with soluble and absorbable hemoglobin and proper keto acids for inducing nitrogen fixation; the second, to be that of supplying these seeds with soluble and absorbable protein decomposition products of blood and proper oxo and thio reactants for inducing formation of enzymes and hormones.

In our procedure we have usually employed dried ox blood and have added thereto small amounts of keto succinic acid (i. e. oxalacetic acid), thio acetic acid, pyruvic acid, keto glutaric acid and similar-type compounds even to those carrying amino groups, though these latter, of course, are already present in dried blood. Thus, that portion of dried blood outside the hemoglobin is directly made utilizable in the direction of condensation with active organic chemicals and to the end that considerable enzymatic material may find early utilization within the sprouting plant.

Generally speaking, a wide range of enzymatric material will activate the porphyrin molecule so long as it carries an iron metallo complex as displayed in the compound hematin. We have found that conjugated structures made up of a globin and the hematinic type of a porphyrin are definitely serviceable in the experiments here concerned.

No one longer questions that the two indispensable factors to plant growth, the hemoglobin and keto acids for nitrogen fixation, and the highly complicated building agents or enzymatic substances, all of which originate in rich decomposing humus, are best made available to growing plants by propitious fungi as mycorrhiza. Our invention, therefore, concerns itself simply in initiating these two factors at the earliest or sprouting stage of the seed when rootlets have scarce begun. Soluble alpha or beta keto aliphatic acids or compounds capable of ready hydrolysis into same admixed with soluble dried blood serves this purpose and to the very best when such mixtures are in direct contact with the seed and held in place by outer pellet coating and carry indole butyric acid.

Under the conditions of this invention we have recorded a much enhanced germination and early growth of plant sometimes registering a time growth by nearly one-half of that ordinarily required for the plain seed to germinate and attain the same stature.

It is likewise advantageous to make use of those additional stimulants as emphasized in earlier applications, namely, chlorophyll, and hence we have freely employed same together with dried blood and alpha or beta keto aliphatic acids within the pellet covering of seed. In all cases the germination of seeds so pelleted is rapid and the early growth of plant outstanding; all the more decisive is this apparent continued rapid growth even after weeks when little or none of the original stimulants can possibly be present.

Furthermore, we have made use of infinitesimal quantities of such hormones as indole acetic acid and indole butyric acid to accentuate root growth at earliest time since the sooner the rootlets become established the more vigorous is plant growth itself.

The invention can be more readily appreciated and evaluated from a consideration of planting tests carried out utilizing the principles of growth accentuation as described above. The test seeds were prepared by coating the seeds with a composition containing the indicated amounts of adjuvants. These were incorporated in a dilute spray of a solution of methyl cellulose and an inert material such as fly ash. Uncoated seeds and pelleted seeds containing regular fungicide and fertilizer were used as controls, as set forth in Examples 1 and 2.

In studies of emergence of sugar beet seed we have carried out the tests in flats of 50 seeds indoors; and in plantings of 100 segmented seeds outdoors.

upon atmospheric conditions. In general, the measurement of the circumference of sugar beet at its upper bulge at surface of any particular tract of ground served as best criterion of the actual growth of beets within this small area. The results of such measurements are tabulated below:

*Table I*

| | Segmented Sugar Beet Seed | Emergence in days | At end of 3 weeks Circumference of upper bulge | At end of 9 weeks Circumference of upper bulge | At end of 12 weeks Circumference of upper bulge |
|---|---|---|---|---|---|
| | | | Inches | Inches | Inches |
| A | Seed alone (Example 1) | 12 | 3.5 | 6 | 9 |
| B | Seed carrying 7½% by weight of Arosan and 10% by weight of calc. super phosphate (Example 2) | 9 | 4.0 | 7 | 10 |
| C | Seed as in Example 2 carrying also 1200 parts dried blood and 200 parts calc. keto succinic per million of bare seed. (Example 5) | 8 | 4.5 | 9 | 12.5 |
| D | Same as in Example 3 with 50 parts per million of indole butyric acid | 7 | 5.0 | 11 | 13.5 |

Measurement of mass of green leaves as well as by weight of same from these four distinct classes accorded proportionately with the several figures above given for root growth of each class A to D.

Similar experiments carried out with chicory and with carrots conform in all respects with the rate of growth as shown in sugar beets.

As has been described previously, the chlorophyll-carotenoid extract of green vegetable matter may be incorporated in the several formulations discussed to further enhance the development in germination and growth, as described in the copending applications referred to.

The coating which carries the beneficial adjuvants may be formed on the seeds in any desired manner. The water soluble material employed in the coating may be any suitable water soluble binder such as methyl cellulose, starch, polyvinyl alcohol, dextrins, sodium alginate and the like. The pellet may be formed by applying to the seed a stream of the solution of water soluble binder while simultaneously applying a stream of inert fillers, such as fly ash, powdered feldspar of about 300 mesh together with the desired adjuvants such as fertilizers, fungicides, dried blood, hormones and the like. The purpose of the inert filler is to extenuate the film-form-

| | Seeds Tested | Indoors (3 runs) out of 50 seeds total emergence, 28 days | Outdoors (3 runs) out of 100 seeds total emergence, 28 days |
|---|---|---|---|
| Example 1 | Unpelleted bare sugar beet seed (segmented) | 21, 20, 17 (Average=38.6% emergence) | 23, 29, 30 (Average=27.3% emergence) |
| Example 2 | Pelleted seed containing regular fungicide and fertilizer: 7½% Arosan 10% Ca. superphosphate Pellet #801.5. | 33, 25, 29 (Average=58% emergence) | 49, 51, 47 (Average=49% emergence) |
| Example 3 | Pelleted seed with fungicide and fertilizer as in #2 plus 800 parts dried blood and 100 parts beta glutaric acid per million of bare seed. Pellet #801.5 E. | 44, 45, 43 (Average=88% emergence) | 67, 72, 75 (Average=71.3% emergence) |
| Example 4 | Pelleted seed with fungicide and fertilizer as in #2 plus 800 parts dried blood and 100 parts keto-succinic acid calc. salt. per million of bare seed Pellet #801.5 I. | 50, 45, 49 (Average=96% emergence) | 71, 77, 78 (Average=75.3% emergence) |
| Example 5 | Pelleted seed with fungicide and fertilizer as in #2 plus 1200 parts of dried blood and 200 parts keto-succinic acid Calc. salt. per million of bare seed. Pellet #801.5 Q. | 49, 49, 48 (Average=97.3% emergence) | 82, 83, 85 (Average=83.3% emergence) |
| Example 6 | Pelleted seed with fungicide and fertilizer as in #5 with addition of 50 parts per million of the hormone indole butyric acid. Pellet #801.5 B. | 48, 48, 48 (Average=96% emergence) | 84, 87, 86 (Average=85.6% emergence) |

It was ascertained that higher concentrations of beta glutaric acid or keto-succinic acid even in form of neutral salt did not effectually raise the percentage of emergence or the rate of growth of emerged plants.

In studying rate of growth of sugar beet plants after emergence there is marked dependence ing binder to prevent a too adherent and impermeable plastic encasement of the seeds. The seeds may be whirled or tumbled in a rotating drum during the application of the coating to build up a pellet of the desired size. The thickness of the shell or encasement may be varied to correlate the pelleted seed with the moisture characteristics of a particular soil in which the seed is to be planted.

While preferred embodiments of the invention have been described it is to be understood that these are given to illustrate the basic concepts of the invention and not as limiting its useful scope to the particular illustrative examples.

We claim:

1. A method of improving the germination of seeds, roots and bulbs which comprises, encasing such seeds, roots and bulbs with an inert carrier material containing a porphyrin metallo complex and a keto aliphatic acid.

2. A method of improving the sprouting and growth of seeds, roots and bulbs which comprises, applying to the surface of the seeds, roots and bulbs an adherent but disintegratable mass which contains a water soluble mixture of a porphyrin metallo complex and a keto aliphatic acid.

3. A method of improving the sprouting and growth of seeds, roots and bulbs which comprises, applying to the surface of the seeds, roots and bulbs an encasement comprising a water soluble binder in which is embodied a water soluble mixture of a porphyrin metallo complex and a keto aliphatic acid.

4. An article of commerce comprising a seed having an adherent coating containing a water soluble binder and a water soluble mixture of a porphyrin metallo complex and a keto aliphatic acid.

5. An article of commerce comprising a seed having an encasing shell comprised of an inert powder, and a hydrophilic binder, said binder being capable of dissolution in moist soil, within which shell is incorporated a mixture of fertilizer, a porphyrin metallo complex, fungicide and a small amount of a keto aliphatic acid.

6. An article of commerce comprising a seed having an encasing shell comprised of an inert powder, and a hydrophilic binder, said binder being capable of dissolution in moist soil, within which shell is incorporated a mixture of fungicide, fertilizer and a small amount of a keto dicarboxylic acid.

7. An article of commerce comprising a seed having an encasing shell comprised of an inert powder and a hydrophilic binder, said binder being capable of dissolution in moist soil, within which shell is incorporated a mixture of fungicide, fertilizer and dried ox blood together with a small amount of keto succinic acid.

8. An article of commerce comprising a seed having an encasing shell comprised of an inert powder and a hydrophilic binder, the binder being capable of dissolution in moist soil, within which is incorporated a mixture of fungicide, fertilizer and dried ox blood together with a small amount of keto glutaric acid.

9. An article of commerce comprising a seed having an adherent coating containing a water soluble binder, an available fertilizer, a fungicide, dried ox blood, together with a small amount of a keto aliphatic acid.

10. An article of commerce comprising a seed having an adherent coating comprising an inert powder bonded with a water soluble binder, in which coating is incorporated a mixture of a porphyrin metallo complex, a keto aliphatic acid and a plant hormone.

11. An article of commerce comprising a seed having an adherent coating comprising an inert powder bonded with dimethyl cellulose, in which coating is incorporated a mixture of dried blood, a keto aliphatic acid and indole butyric acid.

12. An article of commerce comprising a seed having an adherent coating comprising an inert powder bonded with dimethyl cellulose, in which coating is incorporated a mixture of dried blood, dried brewers' yeast, a keto aliphatic acid and indole butyric acid.

13. An article of commerce comprising a seed having an adherent coating comprising an inert powder, bonded with dimethyl cellulose, in which coating is incorporated a mixture of dried blood, extracted chlorophyll, a keto aliphatic acid and indole butyric acid.

14. An article of commerce comprising a seed having an adherent coating comprising an inert powder, bonded with dimethyl cellulose, in which coating is incorporated a mixture of dried ox blood, dried brewer's yeast, extracted chlorophyll, a keto aliphatic acid and indole butyric acid.

15. A method of improving the germination of seeds, roots and bulbs which comprises, encasing such seeds, roots and bulbs within an inert carrier material containing a dried porphyrin of metallo complex and naturally occurring proteins and also oxo-organic compounds.

16. A method of improving the germination of seeds, roots and bulbs which comprises, encasing such seeds, roots and bulbs within an inert carrier material containing a dried porphyrin of iron metallo complex conjugated with a naturally occurring protein, as is a globin, and also a keto aliphatic acid.

17. A method of improving the germination of seeds, roots and bulbs which comprises, encasing such seeds, roots and bulbs with an inert carrier material containing dried hematin-containing animal fluid together with a keto aliphatic acid.

WILLIAM J. HALE.
PHELPS VOGELSANG.

REFERENCES CITED

The following references are of record in the file of this patent:

UNITED STATES PATENTS

| Number | Name | Date |
|---|---|---|
| 1,319,157 | Lingle | Oct. 21, 1919 |
| 2,025,807 | Bjorksten | June 25, 1940 |
| 2,322,760 | Lontz | June 29, 1943 |
| 2,395,446 | Benson | Feb. 26, 1946 |

FOREIGN PATENTS

| Number | Country | Date |
|---|---|---|
| 759,014 | France | Nov. 7, 1933 |

OTHER REFERENCES

Ser. No. 310,759, Alberizzi (A. P. C.) published May 4, 1943.